United States Patent [19]

Fries

[11] 4,325,359

[45] Apr. 20, 1982

[54] FOCUSING SOLAR HEAT COLLECTOR

[76] Inventor: James E. Fries, 7860 Valley View St., Apt. 242, Buena Park, Calif. 90620

[21] Appl. No.: 56,873

[22] Filed: Jul. 12, 1979

[51] Int. Cl.³ .................................................. F24J 3/02
[52] U.S. Cl. .................................. 126/438; 126/417; 126/440; 126/442; 126/450; 126/900; 126/439
[58] Field of Search ............... 126/438, 432, 417, 442, 126/443, 448, 450, 900, 440

[56] References Cited

U.S. PATENT DOCUMENTS

| | | | |
|---|---|---|---|
| 1,258,405 | 3/1918 | Harrison | 126/438 |
| 1,951,403 | 3/1934 | Goddard | 126/900 X |
| 2,907,318 | 10/1959 | Awot . | |
| 3,194,228 | 7/1965 | Bargues . | |
| 3,868,945 | 3/1975 | Konopka et al. | 126/416 |
| 3,939,819 | 2/1976 | Minardi | 126/900 X |
| 3,986,491 | 10/1976 | O'Hanlon | 126/440 |
| 4,055,163 | 10/1977 | Costello et al. . | |
| 4,106,952 | 8/1978 | Kravitz | 126/440 |
| 4,186,723 | 2/1980 | Coppola et al. | 126/443 X |
| 4,198,955 | 4/1980 | Dorbeck | 126/438 X |
| 4,210,128 | 7/1980 | Mattson | 126/900 X |

Primary Examiner—Larry Jones
Attorney, Agent, or Firm—Lyon & Lyon

[57] ABSTRACT

A focusing solar heat collector comprises a light reflective corrugated base surface, a plurality of spaced apart, light-transmitting conduits positioned in the corrugations of the reflective surface so that light reflected by the reflective surface is focused on the conduits, and an organic black liquid of high boiling point circulated through the conduits to receive the focused solar light.

5 Claims, 3 Drawing Figures

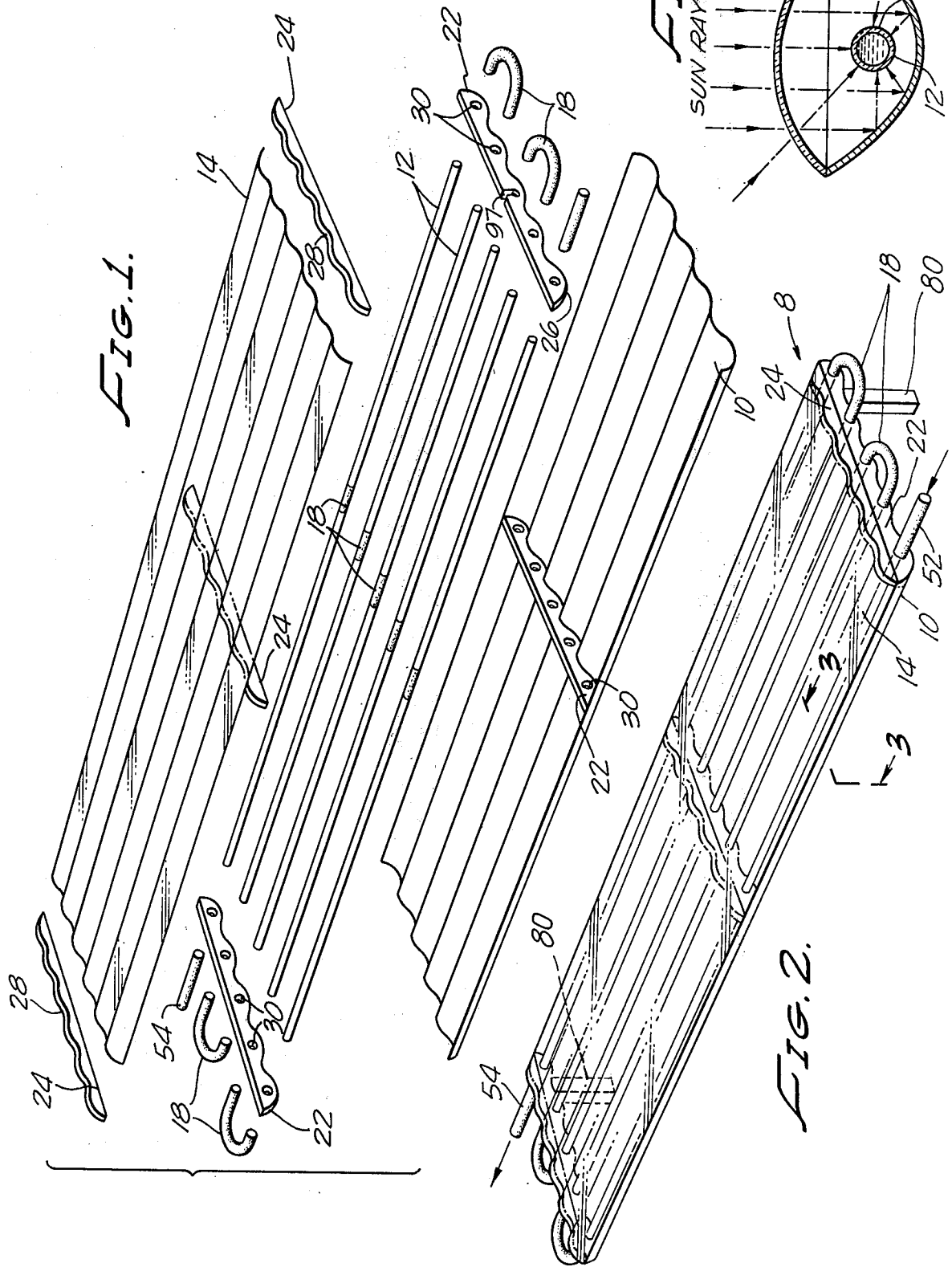

FOCUSING SOLAR HEAT COLLECTOR

BACKGROUND OF THE INVENTION

The present invention relates generally to solar heat collectors. More specifically this invention relates to a focusing solar heat collector.

Due to ever increasing usage of non-renewable energy sources such as fossil fuels, much attention is being directed toward solar energy. Solar energy has been found to be effective in providing space and water heating.

Many solar heat collectors are attractive in performance but lack in cost-effectiveness. Many solar heating systems require several years of operation to return the initial investment, turning many citizens away from solar energy as an alternative energy source. Therefore, there is a need for a simple, efficient, and most importantly, an inexpensive solar heat collector.

Solar heat collectors are generally divided into two catagories depending on how they function to utilize the sunlight.

One category of solar heat collectors utilizes the device of the "green-house effect". Usually they operate in a stationary position, taking advantage of light-transmitting covers which trap heat energy of longer wavelengths produced by penetrating shorter wavelengths of light which are absorbed by black surfaces situated beneath the covers. In U.S. Pat. No. 3,194,228 to Bargues, a black corrugated panel with conduits attached is used to absorb solar radiation. Water is circulated through the conduits to collect the heat. Another "green-house effect" type of collector is described in U.S. Pat. No. 4,055,163 to Costello et al. This collector differs from the Bargues collector in that a black liquid is utilized in lieu of a black corrugated panel to absorb solar radiation. This collector employs a nonfocusing reflective surface to remove unwanted heat. The black fluid is circulated through a light-transmitting conduit which is situated above the reflective surface substantially masking the reflective surface from sunlight when in operation. The heated black liquid is circulated through a heat exchanger which transfers heat to water.

Related to the present invention are focusing type solar heat collectors. Focusing type solar heat collectors, which represent the second category of solar heat collectors, obtain high efficiency by concentrating sunlight by means of reflectors or lenses. A large area of sunlight is focused onto a smaller target or conduit. A liquid such as water is circulated through the target or conduit to collect heat by conduction. In U.S. Pat. No. 2,907,318 to Awot, a corrugated reflected surface is employed as means for focusing sunlight onto conduits positioned in the valleys of the corrugations. This collector employs a light-transmitting cover air spaced over the conduits.

SUMMARY OF THE INVENTION

The present invention is directed to a focusing solar heat collector. The collector comprises a light reflective corrugated base surface, and a plurality of spaced apart, light-transmitting conduits positioned in correspondingly spaced apart corrugations of the reflective surface so light reflected by the reflective surface is focused on the conduits. A light-transmitting upper surface is air spaced over the conduits to protect the reflective surface from weathering and help prevent heat loss on windy days. An organic black liquid having a high boiling point, preferably having a boiling point in excess of that of water, and of at least 300° F., is circulated within the conduits to absorb solar radiation. When the organic black liquid is motor oil, the focusing solar heat collector does not freeze at very low outside temperatures, i.e. below 0° F., and does not boil when exposed to very high outside temperatures, i.e. higher than 110° F.

The focusing solar heat collector is oriented optimally to receive solar energy on a roof or other place. The solar heated black liquid is circulated through a heat exchanger to effect space heating or heating of water for bathing, swimming, or operation of certain heat engines.

DRAWINGS

These and other features, aspects, and advantages of the present invention will become better understood with reference to the following description, appended claims, and accompanying drawings where:

FIG. 1 is an exploded view of a focusing solar heat collector according to the present invention;

FIG. 2 is a perspective view of the focusing solar heat collector of FIG. 1 after assembly; and FIG. 3 is a cross-sectional view of the focusing solar heat collector of FIG. 2 taken along line 3—3 in FIG. 2.

DESCRIPTION

With reference to the figures, a focusing solar heat collector 8 according to the present invention comprises a light reflective corrugated base surface 10, a plurality of spaced apart, light-transmitting conduits 12, and a light-transmitting upper surface 14 which is air spaced over the conduits 12. The conduits 12 are positioned in correspondingly spaced apart corrugations of the reflective surface 10 so that light reflected by the reflective surface is focused on the conduits.

The light reflective corrugated surface can be formed of metal, metallized plastic, plastic coated with aluminum foil, or the like. It is important that the surface 10 reflects a substantial proportion of the light that impinges upon it. The valleys of the corrugations may be parabolic in curvature. Also, the corrugations of the corrugated surfaces are sufficiently large with respect to the conduits 12 such that the conduits do not substantially mask the reflective surface 10 which focuses sunlight upon the conduits 12. Preferably, the conduits 12 can fit within the corrugation valleys without contacting the light reflective surface.

The conduits are substantially transparent, and of necessity, transmit a substantial amount of light. The conduits can be formed by a single tube placed in serpentine fashion within the corrugation. Alternatively, as shown in the drawings, a plurality of separate tubes 12 interconnected by connectors 18 such as neoprene rubber connectors or teflon connectors can be used.

The conduits can be formed of a suitable transparent plastic, or a suitable glass, or the like. Preferably, the material used for the conduits should not be chemically degraded or dissolved by the fluid circulated in the conduits.

Preferably, the conduits are maintained spaced apart from the corrugated surface 10; the air space acts as an insulator because air is a relatively poor conductor of heat. Also, if the collector is not optimally oriented to receive solar light energy, more light rays can be reflected onto the conduits than if a portion of the reflective surface is directly masked (i.e. in contact) with the conduit. At this point, it may be noted that the bottom of the base surface 10 can be layered with insulating material if desired.

The upper surface 14 is made of a light-transmitting material such as glass; or rigid or flexible plastics such as acrylic, Tedlar ®, and polycarbonate; or the like. One or more layers of transparent or nearly transparent materials can be used for the upper surface cover 14. It is not necessary that the upper surface be rigid and corrugated, but it is preferable. The corrugations of the upper surface in combination with the lower surface 10 provide a pleasing aesthetic effect. In addition, a corrugated upper surface 14 imparts added strength and rigidity to the collector and allows rain water drainage. The upper transparent surface 14 helps protect the lower reflective surface 10 from effects of weather which could decrease the reflectivity of the lower surface 10.

As shown in the drawings, the conduits 12 are air spaced apart from both the reflective base surface 10 and the upper surface 14. It is desirable to space the conduits away from both upper surface 14 and lower surface 10 to help avoid conductive heat losses through these surfaces. This spacing can be effected with end and middle spacers in the solar collector. As best shown in FIG. 1, at each end of the solar heat collector and in the middle there are located a bottom spacer 22 and an upper spacer 24. The bottom spacers have a scalloped bottom surface 26 to match the corrugations of the reflective surface 10. Likewise, the top surface 28 of each upper spacer 24 is scalloped to match the corrugations of the upper surface 14. The bottom spacers 22 have mounting holes 30 through which the conduits 12 are supported.

An important feature of the present invention is the working fluid 50 circulated within the conduits 12. The working fluid is an organic liquid having a high boiling point, appreciably above that of aqueous liquids. Preferably, this liquid has a boiling point temperature of at least about 300° F. This allows the working fluid 50 to be used at a greater range of temperatures than aqueous liquids. Unlike conventional solar heaters where water is used as the working fluid, the solar heater of the present invention can withstand even subfreezing temperatures without need for addition of antifreeze chemicals. The use of a high boiling point liquid also lessens the need for pressure relief devices which are a necessary fixture in aqueous systems which have a lower boiling point. Another feature of the working fluid is that it is black. Preferably, the fluid used is motor oil containing carbon, preferably in the form of graphite. Oil does not damage or corrode metal pumps or metal heat exchangers, another advantage. Such a fluid is a commercially available motor oil sold under the trademark of Arco Graphite Motor Oil ®. This is a multi-viscosity oil, which permits it to be used at very low temperatures and very high temperatures. It is an excellent solar heat absorber and can be pumped through the conduits.

In use, the organic black liquid 50 is pumped into the conduits 12 via an entrance 52, passes through all the conduits, and is discharged at the opposite corner 54 of the solar heater.

The solar heated fluid is circulated through commercially available heat exchangers to effect heating of domestic hot water, swimming pools, space heating of a building, or suitable heat engines which can operate in this temperature range.

As shown in FIG. 3, sun rays can pass through the transparent upper cover 14, and impinge directly onto the black fluid 50 or be reflected thereto from the reflective surface 10.

The focusing solar heat collector can be mounted on a roof or other place exposed optimally to direct sunlight. The collector is mounted to orient the conduits horizontally lengthwise in an east-west alignment. Additionally, the collector is tilted on a north-south axis by means of props 80 or supporting tilting frame such that sunlight is optimally focused upon the conduits. A weekly tilting is adequate. More precise focusing could be achieved by a daily adjustment.

In a preferred version of the present invention, the reflective surface 10 is a rectangular 26"×8' reflective aluminum corrugated panel, having 10 corrugations. The conduits are made of transparent heat-shock resistant glass tubing of ½ inch outer diameter which is commercially available under the trademark Pyrex ® or under the trademark Kimax ®. Each piece of tube is 4' long and each row consists of 2 tubes. The individual sections of tubing are connected with neoprene rubber connectors 18 having a ½ inch inner diameter and ¾ inch outer diameter. The entrance connector 52 and discharge connector 54 are likewise neoprene.

Teflon ® tubing and flexible connectors can also be used in lieu of neoprene rubber. Also, the collector can be modified to accommodate glass or plastic tubing which has been performed into a serpentine or manifold shape. This can be achieved by cutting a slot 97 above all mounting holes 30 to receive the rigid glass or plastic configuration.

The focusing solar heat collector of the present invention is inexpensive to fabricate, an operative embodiment of the invention costs less than $15 to manufacture. Moreover, the present invention is sturdy and light-weight, and achieves a high temperature. High heats can be obtained using this focusing arrangement using a black working fluid of a high boiling point. It is aesthetically pleasing, and the black fluid does not corrode the conduits, pumps, or heat exchangers. Furthermore, it can be used in winter without the addition of antifreeze required with solar heat collectors using water as the main constituent of the working fluid. Very hot days or pump breakdowns could boil water in conventional solar heat collectors; pressure problems with water systems could damage a solar heating system.

Another advantage of the collector is that it is not mandatory that the conduits be within an air tight container as required with other solar heaters. Because of the advantages obtained through the focusing arrangement of the present invention along with the use of an efficient black liquid heat absorber, the loss in efficiency resulting from a non-sealed enclosure is more than overcome.

Although the present invention has been described in considerable detail with reference to certain preferred versions thereof, other versions are possible. For example, instead of connecting the conduits 12 in series as shown in the drawings, they can be connected in parallel using manifolds to minimize pressure drop through the focusing solar heat collector. Therefore, the scope of the appended claims should not necessarily be limited to the description of the preferred version contained herein.

What is claimed is:

1. A focusing solar heater collector comprising:
   (a) a light reflective corrugated base surface;
   (b) a plurality of spaced-apart, light-transmitting conduits positioned in correspondingly spaced-apart corrugations of the reflective surface so that light reflected by the reflective surface is focused on the conduits, the conduits not substantially masking the light reflective corrugated base surface from sunlight;
   (c) a light-transmitting upper surface air spaced apart from the conduit;
   (d) a black liquid within the conduits to receive the focused light;
   (e) means for tilting the base surface, conduits, and upper surface together to focus sunlight upon the conduits; and
   (f) means for supporting at least a portion of the conduits air spaced apart from the reflective surface.

2. A focusing solar heater collector comprising:
   (a) a light-reflective corrugated base surface;
   (b) a plurality of spaced-apart, light-transmitting conduits positioned in correspondingly spaced-apart corrugations of the reflective surface so that light reflected by the reflective surface is focused on the conduits, the conduits not substantially masking the light reflective corrugated base surface from sunlight;
   (c) a light-transmitting upper surface air spaced apart from the conduit;
   (d) an organic black liquid having a boiling point of at least 300° F. within the conduits to receive the focused light;
   (e) means for tilting the base surface, conduits, and upper surface together to focus sunlight upon the conduits; and
   (f) means for supporting at least a portion of the conduits air-spaced apart from the reflective surface.

3. The collector of claim 1 or 2 in which the liquid is oil.

4. The collector of claim 3 in which the oil contains graphite.

5. The collector of claim 1 or 2 in which the light-transmitting surface is corrugated.

* * * * *